United States Patent Office 3,533,771
Patented Oct. 13, 1970

3,533,771
NOZZLE FOR DRAWING PLATE GLASS
Otto Stehl, 1 Weiherhofer Str., 8510 Furth (Bay), Germany; Karl Flessa, 90 Regensburger Str., 8480 Weiden, Upper Palatinate, Germany; and Friedrich Wilhelm Dordelmann, 34 Schottstrasse, 5810 Witten (Ruhr), Germany
Filed Dec. 15, 1967, Ser. No. 690,861
Int. Cl. C03b 15/06
U.S. Cl. 65—172     9 Claims

ABSTRACT OF THE DISCLOSURE

A nozzle in which an insert piece of non-metallic corrosion-resistant material is supported in a nozzle body to bound a slot therein through which molten glass is passed thereby to eliminate the formation of cords or stripes in the drawn sheet.

BRIEF SUMMARY OF THE INVENTION

The invention relates to a nozzle for the drawing of plate glass free of cords, especially in the Fourcault process, where there is provided in the nozzle body a straight slot extending essentially over the entire width of the nozzle body and tapered at its ends, through which slot the molten glass is extracted for drawing.

The nozzles generally used up to the present time for the drawing of plate glass, are constituted of chamot i.e. refractory brick. The configuration and design of such nozzles has gradually been refined over the years with regard to the shape of their inflow port, their faces forming the nozzle slot as well as their adjacent nozzle beam, and the drawing of plate glass has thus been continually improved. Nozzles of chamot, however, due to their chemical and physical behavior towards the molten glass, as well as to their mechanical nature, are the source of faults which show up in the ribbon of drawn glass as cords, threads etc. which are very fine stripes inside the plate glass which can be seen at a very small angle, and the cause of which is believed to be corrosion of the chamot material of the nozzle by the action of the molten glass.

Also known are metal nozzles, including the use of precious-metal platings in the lip area of the nozzle for drawing plate glass by the Fourcault process, but the manufacture of such nozzles is complicated and expensive.

An object of the present invention is to provide a nozzle for the drawing of plate glass, which will substantially preclude the formation of cords and other deficiencies, while being simple to make.

According to the invention, there is proposed a nozzle of the kind initially described, which is characterized by the use of a non-metallic material having a very high corrosion resistance in the presence of molten glass. As a further development of the invention, it is proposed concerning a nozzle of this kind, that there be introduced into a nozzle body of chamot, inserts of a highly corrosion resistant non-metallic material, which shall extend over the entire useful length of the nozzle slot and determine its configuration. Advantageously, these inserts of a highly corrosion resistant non-metallic material, are provided only within the area of the surfaces of both nozzle lips which constitute the nozzle slot.

In addition to solving the problem previously discussed, the embodiment of the nozzle according to the invention additionally has notable advantage of considerably increasing the useful life span of the nozzles. On account of the extraordinarily smooth and corrosion-resistant surface of the surface material, any incipient crystallization and thereby all formation of cords and streaks in the ribbon of drawn glass is reliably prevented.

The invention further proposes to use as the highly corrosion-resistant non-metallic material, a product based on $Al_2O_3$—$ZrO_2$—$SiO_2$. However, in accordance with the invention, there can also be used a material composed of $ZrO_2$ and $SiO_2$. According to a further proposal of the invention, the highly corrosion-resistant, non-metallic material can also be a compound of $Al_2O_3$ and $SiO_2$, having an $Al_2O_3$ content of more than 60%. Likewise, it is also possible according to the invention, to utilize as the highly corrosion-resistant material, a product based on $Al_2O_3$, which material has proved to be most appropriate in practical applications. The aforementioned materials of different bases can also be utilized in combination.

According to the invention, the highly corrosion-resistant material based on $Al_2O_3$—$ZrO_2$—$SiO_2$; or on $ZrO_2$—$SiO_2$ or on $Al_2O_3$—$SiO_2$ with an $Al_2O_3$ content exceeding 60%; or on $Al_2O_3$, can be poured in molten state, slip-kiln poured, or pressed and subsequently fired or sintered.

The invention further contemplates, that the tapered regions at both ends of the nozzle slot be shortened to such an extent, that the maximum distance from the end of each nozzle lip insert to the adjacent end of the nozzle slot be less than to 20 cm. Thereby, the portion of the drawn glass ribbon within which cords and streaks can be formed is restricted to the outer edge of the ribbon, between the non-corrosive insert and the chamot body. This outer edge is normally removed and scrapped.

According to the invention, the insert pieces have an appropriate height of between 15 and 150 mm.

A further characteristic feature of the invention is that in order to prevent lifting of the insert pieces during the drawing process, the lifting pieces are given a wedge-shaped cross-section which dove-tails into correspondingly shaped recesses in the chamot body. In this manner lifting by the rising glass ribbon of the inert pieces from the nozzle body is prevented.

According to a further embodiment of the invention, the surfaces of the nozzle or rather of the insert pieces of highly corrosion-resistant, non-metallic material, which come into contact with the molten glass, are formed to perfect smoothness. By this feature, the initially mentioned advantageous effects are further improved. The smooth surfaces can be produced, for example, by grinding, honing, milling or turning on a lathe.

According to the invention, the insert pieces on each side of the nozzle slot may consist of several mutually joined insert sections. Especially if the inserts consist of several joined sections, it is appropriate, according to a further embodiment of the invention, to provide in the surface of most pronounced curvature, a round rod or tube consisting of a single piece of highly corrosion-resistant, non-metallic material extending over the entire length of the nozzle slot. This material may, for example, consist of the $Al_2O_3$—$ZrO_2$—$SiO_2$ base material. The one piece round rod or tube extending over the entire length of the nozzle slot, overcomes the danger of formation of cords or streaks in the drawn glass ribbon due to the presence of joints between several insert pieces which the ribbon may have encountered prior to passing over the one-piece round rod or tube.

In a further advantageous embodiment of the invention, the inserts may be heat-resistant metallic sheet material which have been provided with a flame or plasma-sprayed surfacing of the highly corrosion-resistant, non-metallic material. By the utilization of a sheet metal material provided with a flame or plasma-sprayed surface layer, there will result, in addition to the already discussed advantages, the further advantage, that it will be possible to produce single-unit inserts economically in any desired size whereby no joints will exist within the wall areas of the nozzle slot, which could have undesirable influences on the quality of the drawn plate glass.

A particularly appropriate embodiment results, if according to the invention, the inserts provided with a flame or plasma-sprayed surfacing of highly corrosion-resistant, non-metallic material are designed as sheet-metal liners, forming the walls of the nozzle slot, which can be placed onto the nozzle body. These liners can be employed with existing chamot nozzles, and therefore it is not necessary to employ chamot bodies of special shape.

The invention also relates to a method for the production of cord-free plate glass, especially according to the Fourcault process, which is characterized by drawing the glass ribbon from the melt through a drawing nozzle of highly corrosion-resistant, non-metallic material of the composition previously described.

DETAILED DESCRIPTION

Figure 1:
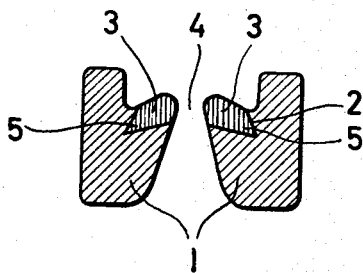
FIG. 1 is a cross-sectional view through a nozzle according to the invention with insert bodies arranged in the facet area.

Although the drawings show various embodiments of a nozzle for the drawing of a glass ribbon, there is common structure for all of said embodiments, and the same numeral designation for the common structure will be retained in all of the figures of the drawing. Thus, reference number 1 designates in FIGS. 1–5, a nozzle body which is constituted of conventional refractory material or chamot. In the embodiments according to FIGS. 1–3, a recess 2 of approximately wedge-shape is in the nozzle body, in the region of smallest width of the nozzle slot 4. Inserts 3 made from highly corrosion-resistant, non-metallic material are inserted into recesses 2. A portion 5 of each insert 3 has a wedge-shaped cross-section by means of which the inserts are secured in the recess 2, thereby to prevent lifting of the inserts 3 by the molten glass band (not shown) which moves upwards through the nozzle slot in FIGS. 1–5.

Several examples of the composition of the inserts 3 are given hereafter;

EXAMPLE I

| | Percent |
|---|---|
| $Al_2O_3$ | 65 |
| $ZrO_2$ | 25 |
| $SiO_2$ | 10 |

Including small quantities of impurities.

EXAMPLE II

| | Percent |
|---|---|
| $Al_2O_3$ | 70 |
| $SiO_2$ | 30 |

Including small quantities of impurities.

Figure 2:
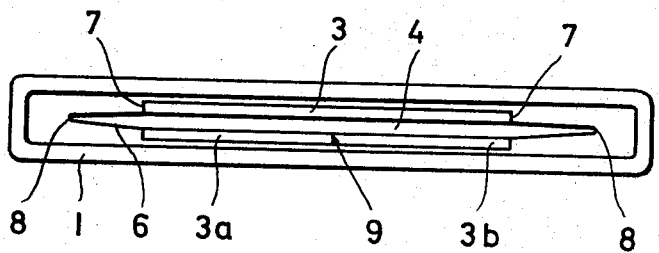
FIG. 2 is a plan view from above of the nozzle of FIG. 1.

In FIG. 2 the ends 6 of the nozzle slot 4 are shown to be tapered and foreshortened so that the joints 7 between the frontal faces of the insert 3 and the frontal faces of the adjacent nozzle body are, at the most, a distance of 20 cm. from the end 8 of the slot 4. In the embodiment shown in FIG. 2 the insert piece 3 represented in the upper portion of the figure is an integral single piece of material. The insert piece visible in the lower portion of the figure consists of two contiguous pieces 3a and 3b. A joint 9 is formed between pieces 3a, 3b. Pieces 3a and 3b can be ground at their contact surfaces and joined by abutment. The pieces can also be cemented at joint 9, and the cement mortar can be fused and the joint subsequently ground smooth. The cement has substantially identical properties to the material of the insert pieces 3a, 3b.

Figure 3:
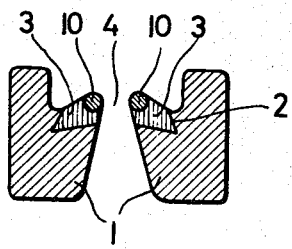
FIG. 3 is a cross-sectional view of the modified embodiment as compared to FIG. 1.
Figure 4:
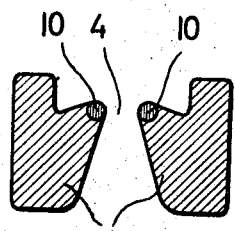
FIG. 4 is a cross-sectional view of another modified embodiment as compared to FIG. 1.

In the embodiment according to FIG. 3 a one piece round-rod or tube section 10 extending over the entire nozzle slot length is arranged in the region of most pronounced curvature of the inserts. The round-rod or tube pieces 10 can be detachably anchored in the frontal walls of the nozzle in any appropriate manner. In the embodiment shown in FIG. 4 each of the insert pieces 3 is constituted as a single round-rod or tube 10.

Figure 5:
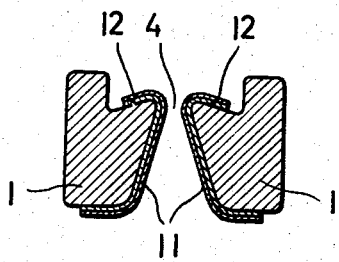
FIG. 5 is a cross-sectional view of a further modified embodiment.

In the embodiment in FIG. 5, the insert pieces are constituted as sheet metal liners 12 made from a heat resistant metallic material, and placed on the nozzle body 1 to form the walls of the nozzle slot 4. The sheet metal liners have been provided with a flame or plasma-sprayed coating 11 of the highly corrosion-resistant, non-metallic material. For this purpose, it suffices that the coating be provided only on the side of the sheet metal liners 12 which is turned towards the nozzle slot 4.

It should be mentioned, that the nozzle according to the invention in its various embodiments is heavier than a conventional chamot nozzle, since the material utilized totally or partially for making the nozzle, (the highly non-corrosive, non-metallic material based on $Al_2O_3$—$ZrO_2$—$SiO_2$) possesses a relatively high specific gravity. Consequently, the nozzle according to the invention when used for drawing glass from the melt does not float on the melt, and it need not be held down at the inception of the drawing process, as is often necessary with simple chamot nozzles. Rather, it must be suspended at the approximate elevation of the melt level.

What is claimed is:

1. A nozzle for drawing plate glass, said nozzle comprising a chamot nozzle body having opposed frontal walls defining an elongated slot through which molten glass is extracted for drawing, said slot having tapered ends, said frontal wall being inclined towards an outlet such that the slot narrows in the direction of glass travel, said nozzle body having upwardly facing surfaces at said outlet and insert pieces supported by the nozzle body in a restricted region at the outlet of the slot, said insert pieces bounding said slot along substantially the entire length thereof between the tapered ends, said nozzle body having elongated recesses in which said insert pieces are received, said recesses having bounding flanks which intersect in V-shaped manner, said insert pieces having a wedge-shaped cross-section corresponding to the V-shaped recesses to engage therein, one flank of each recess extending transversely from an associated frontal wall of the nozzle body towards the line of intersection of said flanks, the other flank exending upwardly from said line of intersection to the upwardly facing surface of the nozzle body, said other flank being tilted to overlie said one flank a distance sufficient that the said other flank exerts a downward retaining force on said insert piece to resist lifting of the insert piece by the flow of molten glass, the insert pieces being shaped to smoothly blend with said frontal walls to cause the material to be removed from the slot free of surface imperfections, said insert pieces being constituted of material consisting essentially of $Al_2O_3$, and $SiO_2$, which is non-metallic and highly corrosion resistant.

2. A nozzle as claimed in claim 1 wherein the $Al_2O_3$ is present in an amount of at least 60%.

3. A nozzle as claimed in claim 1 wherein said tapered ends are relatively short in length and the insert pieces have ends terminating at said tapered ends a distance of no more than 20 cm. from the terminal ends of the slot.

4. A nozzle as claimed in claim 1 wherein said insert pieces have a length in the direction of flow of the glass of between 15 and 150 mm.

5. A nozzles claimed in claim 1 wherein the insert piece on at least one side of the slot is constituted by a plurality of joined segments.

6. A nozzle as claimed in claim 1 wherein the insert pieces have a smooth surface where they bound the slot.

7. A nozzle as claimed in claim 1 wherein said insert pieces have cylindrical surfaces which bound the slot for substantially the entire length thereof between said tapered ends.

8. A nozzle as claimed in claim 7 wherein said walls of said nozzle body have regions of greatest curvature at the outlet of the slot, said cylindrical surfaces of the insert pieces constituting said regions of greatest curvature.

9. A nozzle as claimed in claim 1 wherein each of said insert pieces comprises a body constituted of said material and an element having a cylindrical surface, said element being removably supported in the body of the associated insert piece and bounding the slot for substantially the entire length thereof between said tapered ends; said element also being constituted of said corrosion-resistant material.

References Cited

UNITED STATES PATENTS

| | | | |
|---|---|---|---|
| 1,841,580 | 1/1932 | Fraser et al. | 65—193 X |
| 3,341,315 | 9/1967 | Patschorke | 65—374 X |
| 1,593,566 | 7/1926 | Byrnes | 65—344 |
| 1,739,936 | 12/1929 | Allen et al. | 65—344 |
| 1,901,896 | 3/1933 | Clark | 65—344 |
| 3,397,976 | 8/1968 | Hynd | 65—344 |

ARTHUR D. KELLOGG, Primary Examiner

U.S. Cl. X.R.

65—338, 344, 374; 239—591, 601